G. MUELLER.
BAKING PAN.
APPLICATION FILED OCT. 25, 1916.

1,228,471.

Patented June 5, 1917.
2 SHEETS—SHEET 1.

Inventor
George Mueller
By
Attorney

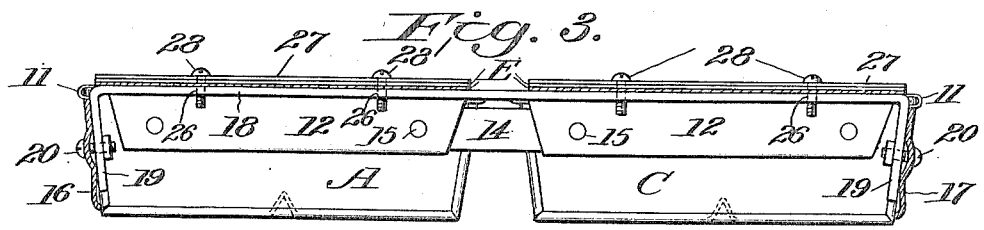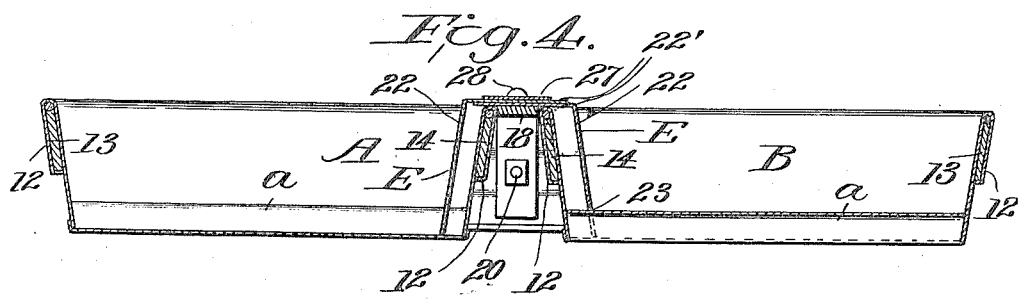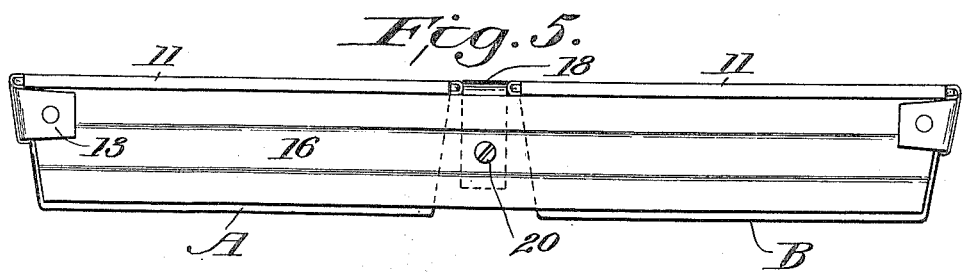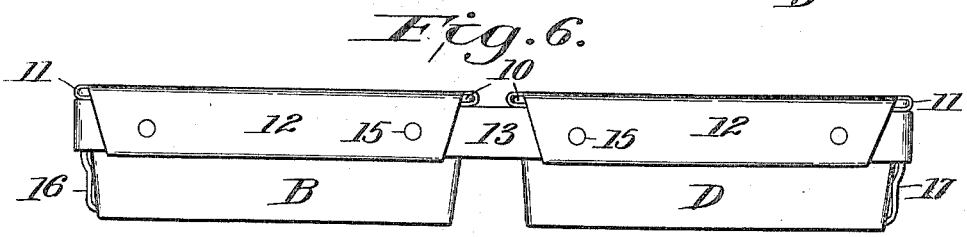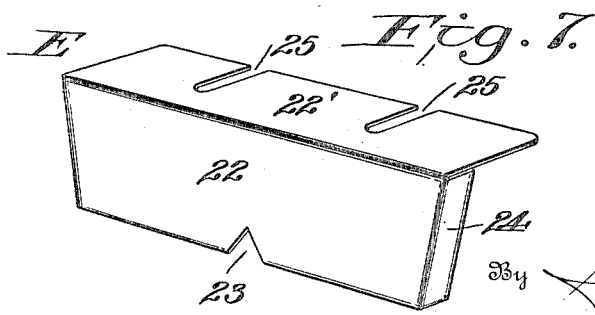

UNITED STATES PATENT OFFICE.

GEORGE MUELLER, OF SALT LAKE CITY, UTAH.

BAKING-PAN.

1,228,471. Specification of Letters Patent. Patented June 5, 1917.

Application filed October 25, 1916. Serial No. 127,640.

*To all whom it may concern:*

Be it known that I, GEORGE MUELLER, a citizen of the United States of America, residing at Salt Lake City, in the county of Salt Lake and State of Utah, have invented certain new and useful Improvements in Baking-Pans, of which the following is a specification.

This invention relates to baking pans.

One object is to provide a multiple baking utensil particularly adapted for use in baking establishments embodying among other characteristics, the provision of means whereby loaves of bread or other commodities may be readily varied in size according to demands, requirements or desires, through the instrumentality of suitable adjusting means readily connected to and operable with relation to the pans.

Another object resides in the provision of a plurality of baking pans rigidly connected together and provided with means whereby one or all of the pans may be adjusted to predetermined capacities and in each of which pans, one or more loaves of bread or other commodities may be baked.

With the above and other objects in view, the present invention consists in the combination and arrangement of parts hereinafter more fully described, illustrated in the accompanying drawings, and particularly pointed out in the appended claims, it being understood that changes may be made in the form, size, proportion and minor details without departing from the spirit or sacrificing any of the advantages of the invention.

In the drawings:

Fig. 3 is an end view, partly in section.

Fig. 4 is a longitudinal sectional view.

Fig. 5 is a side elevation.

Fig. 6 is an end view.

Fig. 7 is a detail perspective view of one of the angular plates of the adjusting means.

Figures 1, 2:
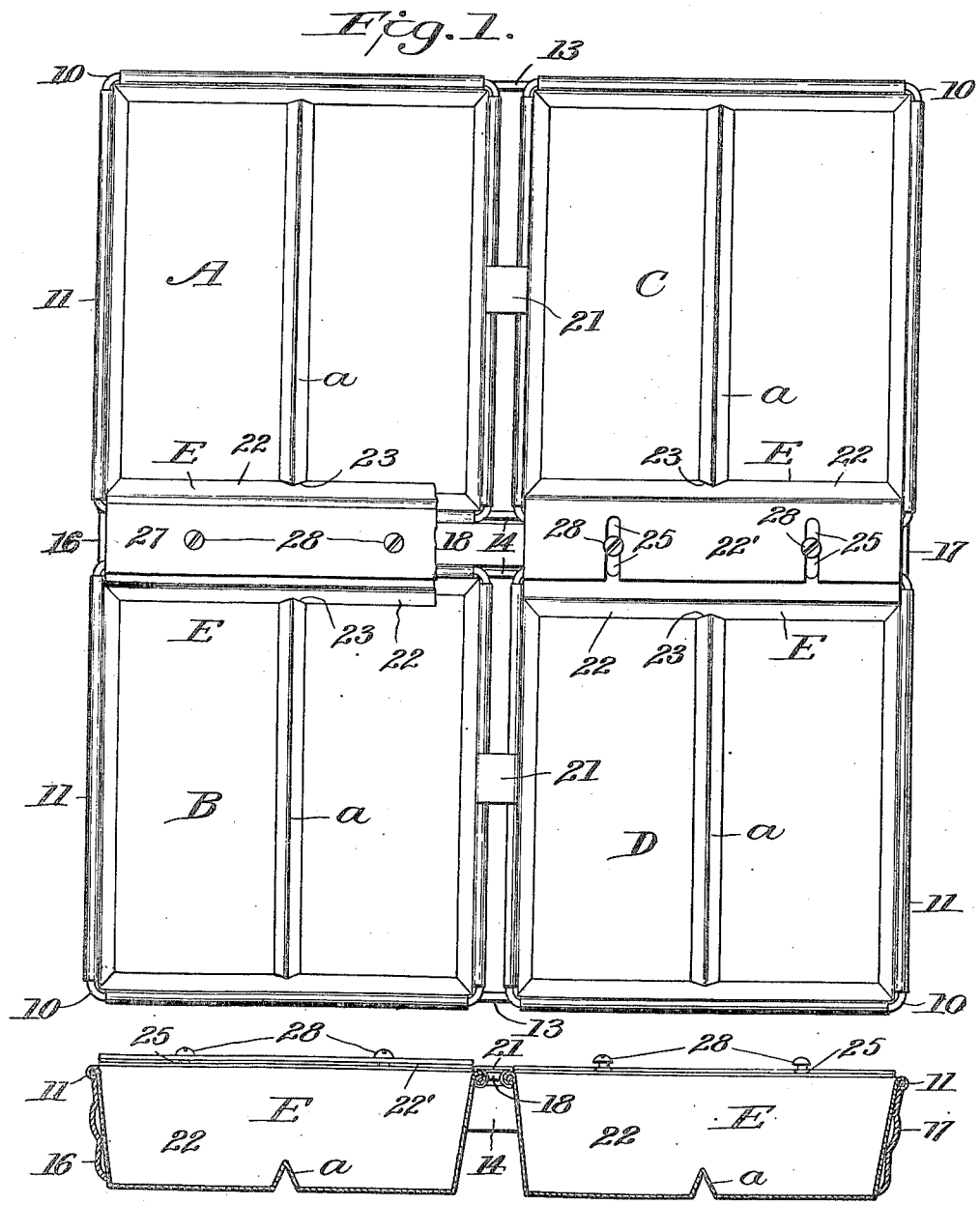
Figure 1 is a plan view of the invention, a part being broken away.
Fig. 2 is a transverse sectional view.

Referring now more particularly to the accompanying drawings, the reference characters A, B, C and D indicate bread pans, each preferably formed alike, and all preferably rigidly connected together. The pans A and B and C and D are arranged preferably end to end in spaced relation, as shown.

The upper edge of each pan is preferably reinforced by means of a suitable wire 10, the sides of each pan being preferably beaded as indicated at 11, to embrace said reinforcing wire and each pan at its ends having relatively wide flaps 12.

Strips 13 and 14 are secured to the ends of the pans. These strips 13 and 14 are preferably disposed between the ends of the pans and their flaps 12, and riveted to the pans by means of suitable rivets 15, or otherwise. The strips 13 and 14 thereby connect the inner and outer ends of the pans A and C, and also the inner and outer ends of the pans B and D.

Strips 16 and 17 are riveted or otherwise secured to the outer sides of the pans A and B and C and D, respectively. These strips 13 and 16 and 17 thereby completely embrace the outer sides and ends of the pans and with the strips 14, provide for rigidity between the pans and this rigidity of the structure may be reinforced by means of a bracing element 18. The ends of the bracing element 18 are turned downwardly, as at 19, to receive the bolt and nut connections 20 which provide for a tight connection between said bracing element 18 and the side bars 16 and 17. The inner sides of the adjacent pans may be further connected together by means of suitable clips 21, if desired.

An adjusting means is provided for the purpose of increasing or decreasing the capacity of the pans A and B, or one of them, and a similar adjusting means is designed to increase or diminish the capacity of the pans C and D, or one of them.

Each adjusting means, for the purpose just stated, consists preferably of two angular plates E, both formed alike, and each consisting of members 22 and 22'. Each member 22 of each of the angular plates E is provided with a notch 23 and at its ends has flanges 24. The notches 23 are of a form like the cross sectional form of the respective ribs $a$ in the bottoms of the pans. These ribs $a$ may not be employed in all pans, and therefore, when said ribs are not employed, said notches 23 may be eliminated from the members 22. The ribs a, when employed, are used to facilitate the baking of a plurality of loaves of bread, or other commodities in one pan and also to facilitate the division of the baked product when removed from the pan.

Each member 22' of the plates E, is provided with spaced slots 25 and these slots of the members 22' of the angular plates E are designed to register with one another and with screw threaded apertures 26 formed in the aforesaid bracing element 18.

When the members E of the adjusting means are placed in coöperative relation with one another and with their aforesaid slots registering with one another and with the aforesaid screw threaded apertures 26 in the bracing element 18, covering plates 27 are placed over the overlapping members 22' of the angular plates E. These covering plates 27 have apertures therein adapted to aline with the aforesaid slots and apertures. Screw-bolts 28 are then passed through the said alining slots and apertures and into the screw threaded apertures 26 of the bracing element 18, whereby the adjusting means may be clamped tightly against accidental displacement or loosening.

By loosening the screw-bolts 28, one or the other of the adjusting members, or both of them, may be adjusted with relation to the respective pans. In other words, the capacity or length of the pan A may be shortened or lengthened with respect to the capacity or length of the pan B or vice versa, or the capacity of both pans may be adjusted to the same degree. What has been said in this respect applies equally to the pans C and D.

Two pans may be connected together instead of four pans or a greater number than four pans may be connected together, if desired. In any event, the construction herewith described and illustrated, provides for a strong, rigid and substantial utensil, particularly adapted for use in baking establishments and one wherein the size of the loaves of bread may be readily determined and varied according to requirements or desires.

What is claimed is:

1. A multiple baking pan comprising a plurality of pans arranged end to end in spaced relation, strips connected to the outer sides of the pans, a bracing element located between the pans and connected to said strips, and means for adjusting the capacity of the pans comprising coöperating angular shaped members adjustably supported on said bracing element.

2. A multiple baking pan comprising a plurality of pans arranged end to end in spaced relation, and means for adjusting the capacity of the pans comprising coöperating angular shaped members supported exteriorly of the pans and having portions operable within the pans and constructed whereby the capacity of one or more pans may be adjusted independently of the adjustment of a capacity of another pan.

3. A multiple baking pan comprising a plurality of pans arranged end to end in spaced relation, and means supported between and extending into the pans for adjusting the capacities of the pans.

4. A multiple baking pan comprising a plurality of pans arranged end to end in spaced relation, and means supported between the pans and extending into the pans for adjusting the capacities of the pans comprising coöperating angular shaped members adjustable with relation to each other.

5. A multiple baking pan comprising a plurality of pans arranged end to end in spaced relation, an element located between the pans provided with screw-threaded apertures, means for adjusting the capacity of the pans comprising coöperating angular shaped members, both of which are provided with slots adapted to aline with relation to each other and with relation to the screw-threaded apertures in said element, a plate having apertures adapted to aline with the aforesaid apertures and slots, and screw-bolts adapted to pass through said alining apertures and slots and have working fit in the screw-threaded apertures of said element whereby the angular shaped members of the adjusting means may be adjusted to vary the capacity of the pans.

6. A multiple baking pan comprising a plurality of pans arranged end to end in spaced relation, an element located between the pans provided with screw-threaded apertures, means for adjusting the capacity of the pans comprising coöperating angular shaped members, both of which are provided with slots adapted to aline with relation to each other and with relation to the screw-threaded apertures in said element, and screw-bolts adapted to pass through said alining apertures and slots and have working fit in the screw-threaded apertures of said element whereby the angular shaped members of the adjusting means may be adjusted to vary the capacity of the pans.

7. A multiple baking pan comprising a plurality of pans, each pan having a rib in its bottom, and means supported between the pans and extending into the pans for adjusting the capacity of the pans, the portions of the adjusting means which extend into the pans having recesses which fit slidably over said ribs.

8. A multiple baking pan comprising a plurality of pans, means for connecting the pans together, and means supported exteriorly of the pans and having portions extending into the pans for adjusting the capacity of the pans.

9. A device of the character described, comprising a baking pan, a rib in the bottom of the pan, means for adjusting the capacity of the pan comprising a member having a portion which projects into the pan and which is provided with a recess adapted to fit over the rib.

In testimony whereof I affix my signature in the presence of two witnesses.

GEORGE MUELLER.

Witnesses:
  J. W. BOUD,
  E. V. UPTON.